(12) United States Patent
Swiatek

(10) Patent No.: US 9,899,705 B2
(45) Date of Patent: Feb. 20, 2018

(54) ELECTROLYTE FOR A LITHIUM-SULPHUR CELL

(71) Applicant: Oxis Energy Limited, Abingdon, Oxfordshire (GB)

(72) Inventor: Agata B. Swiatek, Abingdon (GB)

(73) Assignee: Oxis Energy Limited, Oxfordshire (GB)

( * ) Notice: Subject to any disclaimer, the term of this patent is extended or adjusted under 35 U.S.C. 154(b) by 0 days.

(21) Appl. No.: 15/102,110

(22) PCT Filed: Dec. 16, 2014

(86) PCT No.: PCT/GB2014/053715
§ 371 (c)(1),
(2) Date: Jun. 6, 2016

(87) PCT Pub. No.: WO2015/092380
PCT Pub. Date: Jun. 25, 2015

(65) Prior Publication Data
US 2016/0308246 A1 Oct. 20, 2016

(30) Foreign Application Priority Data
Dec. 17, 2013 (EP) .................................. 13197806

(51) Int. Cl.
| | |
|---|---|
| *H01M 10/0567* | (2010.01) |
| *H01M 10/0525* | (2010.01) |
| *H01M 4/38* | (2006.01) |
| *H01M 4/58* | (2010.01) |
| *H01M 10/052* | (2010.01) |
| *H01M 10/0568* | (2010.01) |
| *H01M 10/0569* | (2010.01) |
| *H01M 2/16* | (2006.01) |
| *H01M 4/134* | (2010.01) |
| *H01M 10/058* | (2010.01) |

(52) U.S. Cl.
CPC ......... *H01M 10/0567* (2013.01); *H01M 2/16* (2013.01); *H01M 4/134* (2013.01); *H01M 4/38* (2013.01); *H01M 4/5815* (2013.01); *H01M 10/052* (2013.01); *H01M 10/058* (2013.01); *H01M 10/0525* (2013.01); *H01M 10/0568* (2013.01); *H01M 10/0569* (2013.01); *H01M 2/162* (2013.01)

(58) Field of Classification Search
CPC ......... H01M 10/0525; H01M 10/0567; H01M 10/0568; H01M 10/0569; H01M 10/058; H01M 2/16; H01M 4/134
See application file for complete search history.

(56) References Cited

U.S. PATENT DOCUMENTS

| | | | |
|---|---|---|---|
| 3,030,720 A | 4/1962 | Osswald et al. | |
| 3,185,590 A | 5/1965 | Mayer et al. | |
| 3,578,500 A | 5/1971 | Maricle et al. | |
| 3,639,174 A | 2/1972 | Kegelman | |
| 3,721,113 A | 3/1973 | Hovsepian | |
| 3,778,310 A | 12/1973 | Garth | |
| 3,877,983 A | 4/1975 | Hovsepian | |
| 3,907,591 A | 9/1975 | Lauck | |
| 3,907,597 A | 9/1975 | Mellors | |
| 3,939,010 A * | 2/1976 | Coleman ................ | C25D 11/34 429/118 |
| 3,951,688 A | 4/1976 | Pankow et al. | |
| 4,060,674 A | 11/1977 | Klemann et al. | |
| 4,104,451 A | 8/1978 | Klemann et al. | |
| 4,118,550 A | 10/1978 | Koch | |
| 4,154,906 A | 5/1979 | Bubnick et al. | |
| 4,163,829 A | 8/1979 | Kronenberg | |
| 4,218,523 A | 8/1980 | Kalnoki-Kis | |
| 4,252,876 A | 2/1981 | Koch | |
| 4,303,748 A | 12/1981 | Armand et al. | |
| 4,318,430 A | 3/1982 | Perman | |
| 4,410,609 A | 10/1983 | Peled et al. | |
| 4,499,161 A | 2/1985 | Foos | |
| 4,503,234 A | 3/1985 | Huwiler et al. | |
| 4,550,064 A | 10/1985 | Yen et al. | |
| 4,690,877 A | 9/1987 | Gabano et al. | |
| 4,725,927 A | 2/1988 | Morimoto et al. | |
| 4,740,436 A | 4/1988 | Kobayashi et al. | |
| 5,079,109 A | 1/1992 | Takami et al. | |
| 5,219,684 A | 6/1993 | Wilkinson et al. | |
| 5,368,958 A | 11/1994 | Hirai et al. | |
| 5,460,905 A | 10/1995 | Skotheim | |
| 5,462,566 A | 10/1995 | Skotheim | |
| 5,523,179 A | 6/1996 | Chu | |
| 5,529,860 A | 6/1996 | Skotheim et al. | |
| 5,532,077 A | 7/1996 | Chu | |

(Continued)

FOREIGN PATENT DOCUMENTS

| | | |
|---|---|---|
| CN | 1389948 | 1/2003 |
| EP | 0 710 995 | 5/1996 |
| EP | 0 764 489 | 3/1997 |
| EP | 0 924 783 | 6/1999 |

(Continued)

OTHER PUBLICATIONS

TERGITOL 15-S Surfactants, The Dow Chemical Company, Jul. 2006 (Year: 2006).*
International Search Report, PCT Application No. PCT/GB2012/051633, dated Feb. 1, 2013.
Written Opinion, PCT Application No. PCT/GB2012/051633, dated Feb. 1, 2013.
International Preliminary Report on Patentability, PCT Application No. PCT/GB2012/052728, dated Aug. 19, 2014.

(Continued)

*Primary Examiner* — Anca Eoff
(74) *Attorney, Agent, or Firm* — Meyertons, Hood, Kivlin, Kowert & Goetzel, P.C.; Mark R. DeLuca

(57) ABSTRACT

An electrolyte for a lithium sulphur cell comprising at least one lithium salt and at least one organic solvent; and a surfactant, wherein the concentration of surfactant in the electrolyte is 0.5-3 weight %.

15 Claims, 1 Drawing Sheet

(56) References Cited

U.S. PATENT DOCUMENTS

| | | | |
|---|---|---|---|
| 5,582,623 A | 12/1996 | Chu | |
| 5,587,253 A | 12/1996 | Gozdz et al. | |
| 5,648,187 A | 7/1997 | Skotheim | |
| 5,744,262 A | 4/1998 | Cheng et al. | |
| 5,789,108 A | 8/1998 | Chu | |
| 5,797,428 A | 8/1998 | Miller | |
| 5,814,420 A | 9/1998 | Chu | |
| 5,919,587 A | 7/1999 | Mukherjee et al. | |
| 5,961,672 A | 10/1999 | Skotheim et al. | |
| 5,962,171 A | 10/1999 | Boguslavsky et al. | |
| 6,030,720 A | 2/2000 | Chu et al. | |
| 6,051,342 A * | 4/2000 | Hamano | H01M 10/04 29/623.4 |
| 6,090,504 A | 7/2000 | Sung et al. | |
| 6,117,590 A | 9/2000 | Skotheim et al. | |
| 6,162,562 A | 12/2000 | Tsuji et al. | |
| 6,174,621 B1 | 1/2001 | Skotheim et al. | |
| 6,201,100 B1 | 3/2001 | Gorkovenko et al. | |
| 6,210,831 B1 | 4/2001 | Gorkovenko et al. | |
| 6,245,465 B1 | 6/2001 | Angell et al. | |
| 6,302,928 B1 | 10/2001 | Xu et al. | |
| 6,319,633 B1 | 11/2001 | Ikeda et al. | |
| 6,344,293 B1 | 2/2002 | Geronov | |
| 6,358,643 B1 | 3/2002 | Katz | |
| 6,376,123 B1 | 4/2002 | Chu | |
| 6,537,704 B1 | 3/2003 | Akashi et al. | |
| 6,544,691 B1 | 4/2003 | Guidotti | |
| 6,613,480 B1 | 9/2003 | Hwang et al. | |
| 6,632,573 B1 | 10/2003 | Nimon et al. | |
| 6,706,449 B2 | 3/2004 | Mikhaylik et al. | |
| 6,733,924 B1 | 5/2004 | Skotheim et al. | |
| 6,797,428 B1 | 9/2004 | Skotheim et al. | |
| 7,108,942 B1 | 9/2006 | Gan et al. | |
| 7,250,233 B2 | 7/2007 | Choi et al. | |
| 7,335,440 B2 | 2/2008 | Aamodt et al. | |
| 7,354,680 B2 | 4/2008 | Mikhaylik et al. | |
| 7,875,393 B2 * | 1/2011 | Ryu | H01M 10/052 252/62.2 |
| 2001/0008736 A1 | 7/2001 | Fanta et al. | |
| 2002/0022181 A1 | 2/2002 | Tsujioka et al. | |
| 2002/0034688 A1 | 3/2002 | Chu et al. | |
| 2002/0039677 A1 | 4/2002 | Iwamoto et al. | |
| 2002/0045101 A1 | 4/2002 | Hwang et al. | |
| 2002/0045102 A1 | 4/2002 | Jung et al. | |
| 2002/0102466 A1 | 8/2002 | Hwang et al. | |
| 2002/0168574 A1 | 11/2002 | Ahn et al. | |
| 2002/0192557 A1 | 12/2002 | Choi et al. | |
| 2003/0073005 A1 | 4/2003 | Kim et al. | |
| 2003/0175596 A1 | 9/2003 | Park et al. | |
| 2003/0180611 A1 | 9/2003 | Mikhaylik et al. | |
| 2003/0190530 A1 | 10/2003 | Yang et al. | |
| 2004/0002002 A1 | 1/2004 | Mitzuta et al. | |
| 2004/0028999 A1 | 2/2004 | LaLiberte | |
| 2004/0048164 A1 | 3/2004 | Jung et al. | |
| 2004/0053129 A1 | 3/2004 | Jung et al. | |
| 2004/0072066 A1 | 4/2004 | Cho et al. | |
| 2004/0091776 A1 | 5/2004 | Hwang | |
| 2004/0096744 A1 * | 5/2004 | Sadamitsu | B29C 55/005 429/254 |
| 2004/0096750 A1 | 5/2004 | Kim et al. | |
| 2004/0101753 A1 | 5/2004 | Hwang | |
| 2004/0137330 A1 | 7/2004 | Lee et al. | |
| 2004/0157132 A1 | 8/2004 | Kim et al. | |
| 2004/0219428 A1 | 11/2004 | Nagayama | |
| 2004/0222768 A1 | 11/2004 | Moore et al. | |
| 2004/0258996 A1 | 12/2004 | Kim et al. | |
| 2005/0136327 A1 | 6/2005 | Miyake et al. | |
| 2005/0156575 A1 | 7/2005 | Mikhaylik | |
| 2005/0221192 A1 | 10/2005 | Hennige et al. | |
| 2005/0238956 A1 | 10/2005 | Lee | |
| 2005/0244693 A1 | 11/2005 | Strutt et al. | |
| 2006/0024579 A1 | 2/2006 | Kolosnitsyn et al. | |
| 2006/0051643 A1 | 3/2006 | Sarkar et al. | |
| 2006/0105233 A1 | 5/2006 | Morita | |
| 2006/0121355 A1 | 6/2006 | Kolosnitsyn et al. | |
| 2006/0177741 A1 | 8/2006 | Kolosnitsyn et al. | |
| 2006/0204856 A1 | 9/2006 | Ryu et al. | |
| 2006/0234126 A1 | 10/2006 | Kolosnitsyn et al. | |
| 2006/0292451 A1 | 12/2006 | Lee et al. | |
| 2007/0072076 A1 | 3/2007 | Kolosnitsyn et al. | |
| 2007/0281210 A1 | 12/2007 | Kolosnitsyn et al. | |
| 2008/0038645 A1 | 2/2008 | Kolosnitsyn et al. | |
| 2008/0060189 A1 | 3/2008 | Daidoji et al. | |
| 2008/0100264 A1 | 5/2008 | Kolosnitsyn et al. | |
| 2009/0053565 A1 | 2/2009 | Iacovelli | |
| 2009/0111029 A1 | 4/2009 | Lee et al. | |
| 2009/0246626 A1 | 10/2009 | Tasaki et al. | |
| 2009/0317717 A1 | 12/2009 | Ryu et al. | |
| 2010/0129724 A1 | 5/2010 | Kolosnitsyn et al. | |
| 2010/0231168 A1 | 9/2010 | Kolosnitsyn et al. | |
| 2010/0273048 A1 * | 10/2010 | Machida | H01M 10/056 429/188 |
| 2011/0059361 A1 | 3/2011 | Wilkening et al. | |
| 2011/0151317 A1 * | 6/2011 | Giroud | H01B 1/122 429/162 |
| 2012/0282530 A1 | 11/2012 | Chiang et al. | |
| 2012/0293114 A1 | 11/2012 | Murochi et al. | |
| 2012/0315553 A1 | 12/2012 | Fuminori et al. | |
| 2014/0079989 A1 * | 3/2014 | Janakiraman | H01M 4/38 429/199 |
| 2015/0147656 A1 | 5/2015 | Kogetsu et al. | |

FOREIGN PATENT DOCUMENTS

| | | |
|---|---|---|
| EP | 1 176 659 | 1/2002 |
| EP | 1 178 555 | 2/2002 |
| EP | 1 400 996 | 3/2004 |
| EP | 1 420 475 | 5/2004 |
| EP | 1 865 520 | 12/2007 |
| EP | 1 962 364 | 8/2008 |
| EP | 2 023 461 | 2/2009 |
| EP | 2 026 402 | 2/2009 |
| EP | 2 259 376 | 12/2010 |
| GB | 2084391 | 4/1982 |
| GB | 2200068 | 7/1988 |
| JP | 59-194361 | 11/1984 |
| JP | 63-081767 | 4/1988 |
| JP | 64-107467 | 4/1989 |
| JP | 01-124969 | 5/1989 |
| JP | 08-069812 | 3/1996 |
| JP | 08-138650 | 5/1996 |
| JP | 08-138742 | 5/1996 |
| JP | 08-298229 | 11/1996 |
| JP | 08-298230 | 11/1996 |
| JP | 09-027328 | 1/1997 |
| JP | 09-147913 | 6/1997 |
| JP | 10-284076 | 10/1998 |
| JP | 11-273729 | 10/1999 |
| JP | 2001-167751 | 6/2001 |
| JP | 2002-075446 | 3/2002 |
| JP | 2005-071641 | 3/2005 |
| JP | 2005-108724 | 4/2005 |
| JP | 2005-005215 | 6/2005 |
| JP | 2005-243342 | 9/2005 |
| JP | 2006-134785 | 5/2006 |
| JP | 2009-087728 | 4/2009 |
| JP | 2011-108469 | 6/2011 |
| JP | 2011-192574 | 9/2011 |
| KR | 10-2002-0089134 | 11/2002 |
| KR | 10-2003-0368753 | 4/2003 |
| KR | 10-2003-0056497 | 7/2003 |
| KR | 10-2011-0024707 | 3/2011 |
| WO | 2001-047088 | 6/2001 |
| WO | 2001-097304 | 12/2001 |
| WO | 2002-095849 | 11/2002 |
| WO | 2006-050117 | 5/2006 |
| WO | 2007-111988 | 10/2007 |
| WO | 2007-132994 | 11/2007 |

OTHER PUBLICATIONS

International Search Report, Application No. PCT/GB2014/05088, dated Jul. 7, 2014.

(56) References Cited

OTHER PUBLICATIONS

Written Opinion, Application No. PCT/GB2014/05088, dated Jul. 7, 2014.
International Preliminary Report on Patentability, Application No. PCT/GB2014/050888, dated Sep. 29, 2015.
International Search Report, Application No. PCT/GB2014/050890, dated Jun. 2, 2014.
Written Opinion, Application No. PCT/GB2014/050890, dated Jun. 2, 2014.
International Preliminary Report on Patentability, Application No. PCT/GB2014/050890, dated Sep. 29, 2015.
International Search Report, Application No. PCT/GB2014/050891, dated Jul. 24, 2014.
Written Opinion, Application No. PCT/GB2014/050891, dated Jul. 24, 2014.
International Preliminary Report on Patentability, Application No. PCT/GB2014/050891, dated Sep. 29, 2015.
International Search Report, Application No. PCT/GB2014/052474, dated Nov. 5, 2014.
Written Opinion, Application No. PCT/GB2014/052474, dated Nov. 5, 2014.
International Preliminary Report on Patentability, Application No. PCT/GB2014/052474, dated Feb. 16, 2016.
International Search Report, Application No. PCT/GB2014/053715, dated Feb. 27, 2015.
Written Opinion, Application No. PCT/GB2014/053715, dated Feb. 27, 2015.
International Preliminary Report on Patentability, Application No. PCT/GB2014/053715, dated Jun. 21, 2016.
International Search Report, Application No. PCT/GB2014/053719, dated Feb. 24, 2015.
Written Opinion, Application No. PCT/GB2014/053719, dated Feb. 24, 2015.
International Preliminary Report on Patentability, PCT Application No. PCT/GB2012/051633, dated Jun. 17, 2014.
International Search Report, PCT Application No. PCT/GB2012/052728, dated Jan. 2, 2013.
Written Opinion, PCT Application No. PCT/GB2012/052728, dated Jan. 2, 2013.
International Preliminary Report on Patentability, Application No. PCT/GB2014/053719, dated Jun. 21, 2016.
Aurbach et al., "A Short Review of Failure Mechanism of Lithium Metal and Lithiated Graphite Anodes in Liquid Electrolyte Solutions", Solid State Lonics, 2002, vol. 148, p. 405-416.
Bates et al., "Solvent Effects on Acid-Base Behavior: Five Uncharged Acids in Water-Sulfolane Solvents", 1976, Journal of Solution Chemistry, vol. 5, No. 3, p. 213-222.
Chagnes et al., "Butyrolactone-Ethylene Carbonate Based Electrolytes for Lithium Ion Batteries", Jul. 2003, Journal of Applied Electrochemistry, 33, p. 589-595.
Chang et al., "Binary Electrolyte Based on Tetra (ethylene glycol) Dimethyl Ether and 1,3-dioxolane for Lithium-Sulphur Battery", J. Power Sources, 2002, vol. 112, p. 452-460.
Cowie et al. "Ion Conduction in Macroporous Polyethylene Film Doped With Electrolytes" Solid State Ionics 109 (1998) 139-144.
Fujinaga et al. "Electrochemical Reduction of Elemental Sulphur in Acetonitrile", Bull Chem. Soc. Jpn. 1980, vol. 53, p. 2851-2855.
Jeon et al. Solvent-Free Polymer Electrolytes Based on Thermally Annealed Porous P(VdF-HFP)/P(EO-EC) Membranes.
Kolosnitsyn "Physicochemical and Electrochemical Properties of Sulfolane Solutions of Lithium Salts", Russian Journal of Electrochemistry, May 2008, vol. 44(5), p. 575-578.
Komaba et al., "Inorganic Electrolyte Additives to Supress the Degradation of Graphite Anodes by Dissolved Mn(II) for Lithium Ion Batteries", Mar. 2003, Journal of Power Sources, 1190121, p. 378-382.
Levillain et al., "On the Understanding of the Reduction of Sulphur (S8) in Dimethylformamide (DMF)", J. of Electroanalytical Chemistry, 1997, vol. 420, p. 167-177.

Nazri et al., "Lithium Batteries: Science and Technology", 2003, p. 509-573, Hardcover, ISBN: 978-1-4020-7628-2.
Paris et al. "Electrochemical Reduction of Sulphur in Dimethylacetamide", Electrochimica Acta, 1981, vol. 26, No. 12, p. 1823-1829.
Peled et al., "Rechargeable Lithium-Sulphur Battery (extended abstract)", J. of Power Sources, 1989, vol. 26, p. 269-271.
Peled et al., "Lithium-Sulphur Battery: Evaluation of Dioxolane-Based Electrolytes", J. Electrochem Soc., 1989, vol. 136, No. 6, p. 1621-1625.
Rauh et al., "Formation of Lithium Polysulphides in Aprotic Media", J. Inorg. Nucl Chem, 1977, vol. 39, p. 1761-1766.
Rauh et al., "A Lithium/Dissolved Sulphur Battery with an Organic Electrolyte", J. Electrochem Soc., 1979, vol. 126, No. 4, p. 523-527.
Suo et al. "A New Class of Solvent-in-Salt Electrolyte for High-Energy Rechargeable Metallic Lithium Batteries" Nature Communications, 2013, vol. 4, p. 1481.
Tobishima et al, "Study on the Reduction Species of Sulphur by Alkali Metals in Nonaqueous Solvents", Electrochimica Acta, 1997, vol. 42, No. 6, p. 1019-1029.
Ultralife Batteries Inc. "Transportation Regulations for Lithium, Lithium Ion and Polymer Cells and Batteries", Rev. H, Dec. 18, 2003.
Yamin et al., "Electrochemistry of a Nonaqueous Lithium/Sulphur Cell", J of Power Sources, 1983, vol. 9, p. 281-287.
Yamin et al., "The Electrochemical Behavior of Polysulphides in Tetrahydrofuran", J. of Power Sources, 1985, vol. 14, p. 129-134.
Yamin et al., "Lithium Sulphur Battery Oxidation/Reduction Mechanisms of Polysulphides in THF Solution", J. Electrochem Soc. 1988, vol. 135, No. 5, p. 1045-1048.
Office Action, U.S. Appl. No. 11/290,825, dated Jun. 11, 2009.
Office Action, U.S. Appl. No. 11/526,876, dated Oct. 30, 2009.
Office Action, U.S. Appl. No. 11/190,203, dated Apr. 3, 2009.
Office Action, U.S. Appl. No. 11/190,203, dated Oct. 9, 2009.
Office Action, U.S. Appl. No. 11/332,471, dated Aug. 21, 2007.
Office Action, U.S. Appl. No. 11/332,471, dated Feb. 20, 2007.
Office Action, U.S. Appl. No. 11/332,471, dated Sep. 28, 2007.
Office Action, U.S. Appl. No. 11/332,471, dated Mar. 11, 2008.
Office Action, U.S. Appl. No. 11/332,471, dated Aug. 27, 2008.
Office Action, U.S. Appl. No. 11/332,471, dated Feb. 26, 2009.
Office Action, U.S. Appl. No. 11/332,471, dated Jul. 31, 2009.
Office Action, U.S. Appl. No. 11/386,113, dated Jan. 6, 2009.
Office Action, U.S. Appl. No. 11/386,113, dated Aug. 19, 2008.
Office Action, U.S. Appl. No. 11/386,113, dated Feb. 5, 2008.
Office Action, U.S. Appl. No. 11/889,334, dated Aug. 14, 2009.
UK Search Report, Application No. GB 0416708.6, Section 17, dated Aug. 10, 2004.
UK Search Report, Application No. GB 0501001.2, dated Apr. 14, 2005.
Japanese Office Action for JP Application No. 2007-550839 dated Apr. 1, 2014.
Korean Office Action for Application No. 10-2013-7031637, dated Jan. 27, 2014.
International Search Report, Application No. PCT/GB2005/002850, dated Aug. 25, 2005.
Written Opinion, Application No. PCT/GB2005/002850, dated Aug. 25, 2005.
International Preliminary Report on Patentability, Application No. PCT/GB2005/002850, dated Jan. 30, 2007.
International Search Report, Application No. PCT/GB2006/000103, dated Jun. 20, 2007.
Written Opinion, Application No. PCT/GB2006/000103, dated Jun. 20, 2007.
International Preliminary Report on Patentability, Application No. PCT/GB2006/000103, dated Jul. 24, 2007.
International Search Report, Application No. PCT/GB2006/050300, dated Dec. 6, 2006.
Written Opinion, Application No. PCT/GB2006/050300, dated Dec. 6, 2006.
International Preliminary Report on Patentability, Application No. PCT/GB2006/050300, dated Mar. 26, 2008.

* cited by examiner

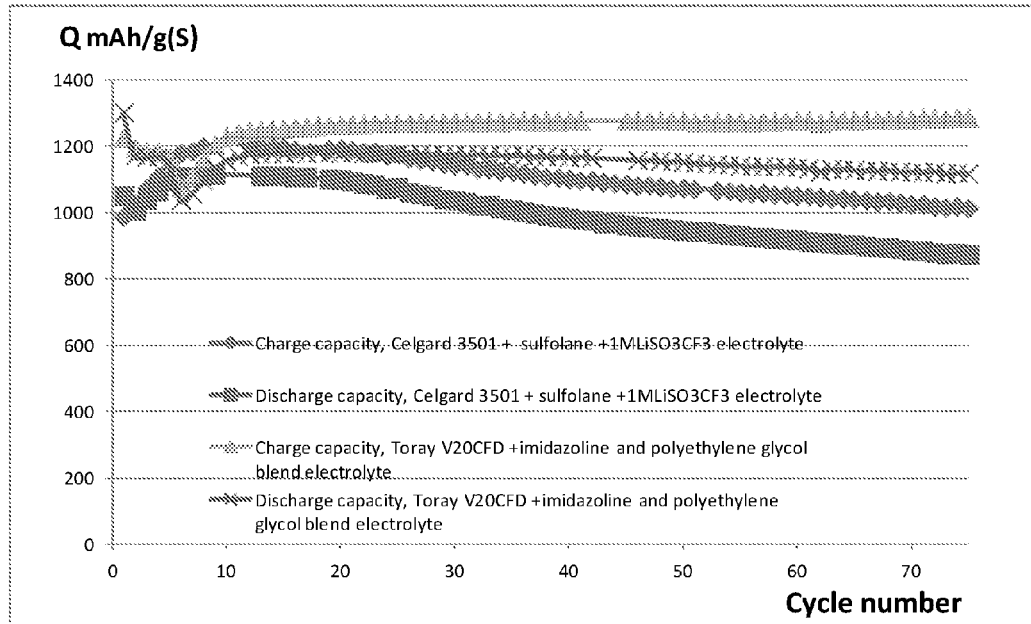
Figure 1 Charge and discharge capacities of two lithium-sulphur cells over a number of cycles
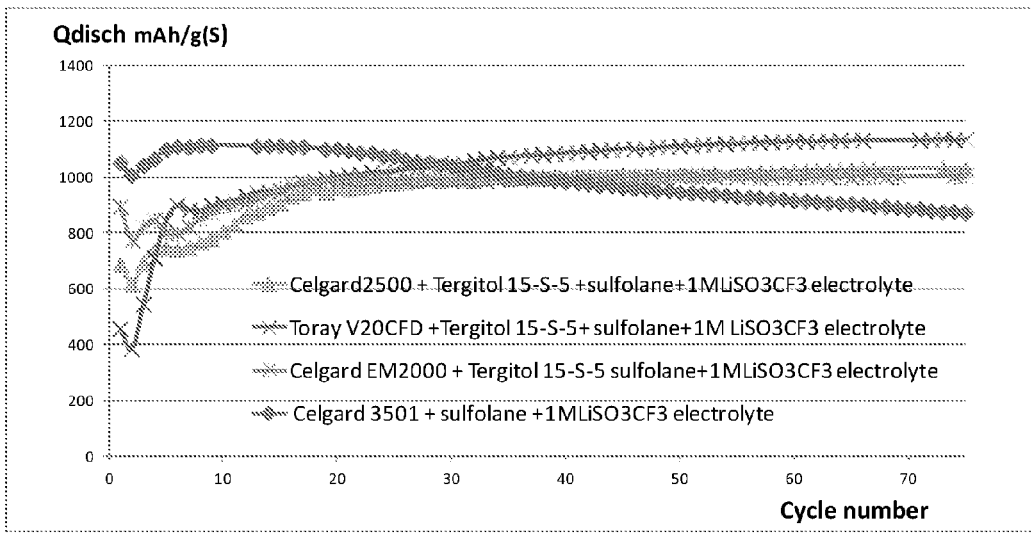
Figure 2 Discharge capacities of lithium-sulphur cells over a number of cycles

ELECTROLYTE FOR A LITHIUM-SULPHUR CELL

The present invention relates to an electrolyte for a lithium-sulphur cell. The present invention also relates to a lithium-sulphur cell. The present invention further relates to a method of producing a lithium-sulphur cell.

BACKGROUND

A typical lithium-sulphur cell comprises an anode (negative electrode) formed from lithium metal or a lithium metal alloy, and a cathode (positive electrode) formed from elemental sulphur or other electroactive sulphur material. The sulphur or other electroactive sulphur-containing material may be mixed with an electrically conductive material, such as carbon, to improve its electrical conductivity. Typically, the carbon and sulphur are ground and then mixed with a solvent and binder to form a slurry. The slurry is applied to a current collector and then dried to remove the solvent. The resulting structure is calendared to form a composite structure, which is cut into the desired shape to form a cathode. A separator is placed on the cathode and a lithium anode placed on the separator. Electrolyte is introduced into the cell to wet the cathode and separator.

Lithium-sulphur cells are secondary cells, and may be recharged by applying an external current to the cell. Rechargeable cells of this type have a wide range of potential applications, and one important consideration when developing lithium-sulphur secondary cells is maximising the useful cycle life of the cell.

BRIEF DESCRIPTION OF THE DRAWINGS

Advantages of the present invention will become apparent to those skilled in the art with the benefit of the following detailed description of embodiments and upon reference to the accompanying drawings in which:

FIG. 1 depicts a graph of the capacity of a lithium-sulphur cell over 100 cycles comparing an electrolyte with and without surfactant; and FIG. 2 depicts a graph of the capacity of a lithium-sulphur cell over 100 cycles with an electrolyte having a surfactant.

DESCRIPTION

Before particular examples of the present invention are described, it is to be understood that the present disclosure is not limited to the particular cell, method or material disclosed herein. It is also to be understood that the terminology used herein is used for describing particular examples only and is not intended to be limiting, as the scope of protection will be defined by the claims and equivalents thereof.

In describing and claiming the cell and method of the present invention, the following terminology will be used: the singular forms "a", "an", and "the" include plural forms unless the context clearly dictates otherwise. Thus, for example, reference to "an anode" includes reference to one or more of such elements.

According to one aspect of the present invention, there is provided an electrolyte for a lithium-sulphur cell comprising at least one lithium salt and at least one organic solvent; and a surfactant, wherein the concentration of surfactant in the electrolyte is 0.5-3 weight %.

According to another aspect of the present invention, there is provided a lithium-sulphur cell comprising:

an anode comprising lithium metal or lithium metal alloy;
a cathode comprising a mixture of electroactive sulphur material and solid electroconductive material;
a porous separator; and
an electrolyte comprising at least one lithium salt, at least one organic solvent and a surfactant.

According to a further aspect of the invention, there is provided a method of producing the claimed lithium-sulphur cell, said method comprising:

incorporating an electrolyte comprising at least one lithium salt, at least one organic solvent, and a surfactant into a cell assembly comprising an anode comprising lithium metal or lithium metal alloy, a cathode comprising a mixture of electroactive sulphur material and solid electroconductive material, and a porous separator.

Advantageously, it has been found that the electrolyte according to the present invention increases the charge and discharge capacity of a lithium sulphur cell. It is believed that the surfactant in the electrolyte according to the present invention provides increased wettability of both the separator and the cathode. This results in an increase in cell capacity and improved rate and cycle properties, such as cycle life, of the cell.

While separators with a surfactant coating are commercially available, it has been found that the use of the electrolyte of the present invention provides improved cycle life and also allows not only a wide range of separators to be used, but allows the use of suitable surfactants in their optimum conditions.

It has also been found that, when surfactant is present in the electrolyte, the electrolyte advantageously soaks into the cathode more readily, wetting the cathode more effectively. As the electrolyte soaks into the cathode, any air trapped in the mixture of electroactive sulphur material and solid electroconductive material is displaced. In the absence of the surfactant, penetration into the cathode may be less effective and, as a result, pockets of air may remain in the cathode structure. The addition of surfactant to the electrolyte is also advantageous in that it prevents or reduces leakage of the electrolyte e.g. during construction of a lithium-sulphur cell, due to said improved penetration and cathode wetting.

As discussed above, according to one aspect of the present invention there is provided an electrolyte for a lithium-sulphur electrochemical cell comprising at least one lithium salt and at least one organic solvent; and a surfactant, wherein the concentration of surfactant in the electrolyte is 0.5-3 weight %.

Preferably, the concentration of surfactant in the electrolyte is 0.75-2.25 weight %, more preferably 1.25-1.75 weight %, for example 1.5 weight %.

Preferably, the surfactant is a non-ionic surfactant. Suitable surfactants include long chain alcohols (such as fatty alcohols, cetyl alcohol, stearyl alcohol, cetostearyl alcohol and olely alcohol); alcohol ethoxylates (eg Tergitol 15-S-5, -7 and -9); polyoxyethylene glycol alkyl ethers (Brij), for example octaethylene glycol monododecyl ether and pentaethylene glycol monododecyl ether; polyoxypropylene glycol alkyl ethers; glucoside alkyl ethers, for example decyl glucoside, lauryl glucoside and octyl glucoside; polyoxyethylene glycol octylphenol ethers, for example Triton X-100; polyoxyethylene glycol alkylphenol ethers, for example nonxynol-9; glycerol alkyl esters, for example glyceryl laurate; polyoxyethylene glycol sorbitan alkyl esters, sorbitan alkyl esters, cocamide MEA, cocamide DEA, dodecyldimethylamine oxide, block copolymers of polyethylene glycol and polypropylene glycol (poloxamers) and polyethoxy tallow amine (POEA). Preferably, the surfactant does not include fluorine. Preferably, the surfactant is not a fluorine-based surfactant represented by a formula:

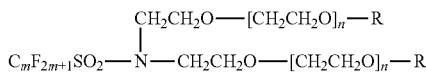

wherein R is a hydrogen, an acetyl group, a methyl group, or a benzoyl group; and m and n are integers from 2 to 20.

Preferably, the surfactant is selected from secondary alcohol ethoxylates, tetraethylene glycol dodecyl ethers, silicone glycols, imidazolines, polyoxyethylene sorbitan monopalmitates and polyoxyethylene nonyl-phenyl ethers and mixtures thereof. In one embodiment, the surfactant is an alcohol ethoxylate, a polyethylene glycol alkyl ether (e.g. polyethylene glycol dodecyl ether) or a polyoxytheylene alkyl ether (e.g. polyoxyethylene oleyl ether or polyoxyethylene lauryl ether).

In a preferred embodiment, the surfactant is an alcohol ethoxylate, for example, a secondary alcohol ethoxylate. For example, the secondary alcohol ethoxylate may have the general formula:

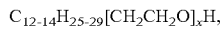

where x is an integer of 5 to 9, for example, 5, 7 or 9.

In one embodiment, the surfactant has the formula:

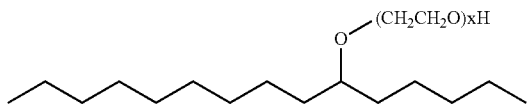

where x is an integer of 5 to 9, for example, 5, 7 or 9, preferably 5. Suitable examples of such surfactants include those sold under the trademark Tergitol 15-S, for example, Tergitol 15-S-5, Tergitol 15-S-7 and Tergitol 15-S-9.

Without wishing to be bound by any theory, alcohol ethoxylates (e.g. the secondary alcohol ethoxylates described above) can be used to improve the discharge capacity and/or cycling efficiency of a lithium-sulphur cell. Electrolytes containing such surfactants have been found to be capable of wetting separators formed, for example, of polypropylene and/or polyethylene more effectively. This in turn may improve the electrochemical performance of the cell. In some embodiments, the effect is particularly pronounced when the electrolyte comprises a sulfone solvent, for example, sulfolane. Sulfolane is typically viscous and may not wet the cell's separators effectively. However, when an alcohol ethoxylate is dispersed in a sulfone (e.g. sulfolane) solvent, the wetting capability of the solvent may be significantly improved.

Suitable lithium salts include at least one of lithium hexafluorophosphate (LiPF$_6$), lithium hexafluoroarsenate (LiAsF$_6$), lithium perchlorate (LiClO$_4$), lithium trifluoromethanesulfonimide (LiN(CF$_3$SO$_2$)$_2$)), lithium borofluoride, lithium trifluoromethanesulphonate (CF$_3$SO$_3$Li), and lithium bis(oxalato)borate (LiB(C$_2$O$_4$)$_2$). Preferably the lithium salt is lithium trifluoromethanesulphonate.

Suitable organic solvents for use in the electrolyte are tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1,3-dioxolane, diglyme (2-methoxyethyl ether), tetraglyme, ethylene carbonate, propylene carbonate, γ-butyrolactone, dioxolane, hexamethyl phosphoamide, pyridine, dimethyl sulfoxide, tributyl phosphate, trimethyl phosphate, N,N,N,N-tetraethyl sulfamide, and sulfone and their mixtures. Preferably, the organic solvent is a sulfone or a mixture of sulfones. Examples of sulfones are dimethyl sulfone and sulfolane. Sulfolane may be employed as the sole solvent or in combination, for example, with other sulfones.

The organic solvent used in the electrolyte should be capable of dissolving the polysulphide species, for example, of the formula $S_n^{2-}$, where n=2 to 12, that are formed when the electroactive sulphur material is reduced during discharge of the cell.

In one embodiment, the electrolyte comprises lithium trifluoromethanesulphonate and sulfolane.

The concentration of lithium salt in the electrolyte is preferably 0.1 to 5M, more preferably 0.5 to 3M, for example, 1M. The lithium salt is preferably present at a concentration that is at least 70%, preferably at least 80%, more preferably at least 90%, for example, 95 to 99% of saturation.

As discussed above, according to another aspect of the invention there is provided a lithium-sulphur electrochemical cell comprising: an anode comprising lithium metal or lithium metal alloy; a cathode comprising a mixture of electroactive sulphur material and solid electroconductive material; a porous separator; and an electrolyte comprising at least one lithium salt, at least one organic solvent and a surfactant.

The electrochemical cell of the present invention may be any suitable lithium-sulphur cell. The cell includes an anode, a cathode, an electrolyte and a porous separator, which may advantageously be positioned between the anode and the cathode. The anode is formed of lithium metal or a lithium metal alloy. Preferably, the anode is a metal foil electrode, such as a lithium foil electrode. The lithium foil is formed of lithium metal or lithium metal alloy.

The cathode of the electrochemical cell includes a mixture of electroactive sulphur material and electroconductive material. This mixture forms an electroactive layer, which may be placed in contact with a current collector.

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Preferably, carbon black is employed.

The mixture of electroactive sulphur material and electroconductive material may be applied to the current collector in the form of a slurry in a solvent (e.g. water or an organic solvent). The solvent may then be removed and the resulting structure calendared to form a composite structure, which may be cut into the desired shape to form a cathode. A separator may be placed on the cathode and a lithium anode placed on the separator. Electrolyte may then be incorporated into the assembled cell to wet the cathode and separator.

Alternatively, following the formation of the cathode, the electrolyte may be coated onto the cathode. The separator may then be placed over the coated cathode, and the anode placed over the separator.

As discussed above, the cell comprises an electrolyte. The electrolyte is present or disposed between the electrodes, allowing charge to be transferred between the anode and cathode. Preferably, the electrolyte wets the pores of the cathode as well as the pores of the separator.

The electrolyte comprises at least one lithium salt, at least one organic solvent and a surfactant. Suitable lithium salts include at least one of lithium hexafluorophosphate (LiPF$_6$), lithium hexafluoroarsenate (LiAsF$_6$), lithium perchlorate (LiClO$_4$), lithium trifluoromethanesulfonimide (LiN(CF$_3$SO$_2$)$_2$)), lithium borofluoride, lithium trifluoromethanesulphonate (CF$_3$SO$_3$Li), and lithium bis(oxalato)borate (LiB(C$_2$O$_4$)$_2$). Preferably the lithium salt is lithium trifluoromethanesulphonate.

Suitable organic solvents for use in the electrolyte are tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1,3-dioxolane, diglyme (2-methoxyethyl ether), tetraglyme, ethylene carbonate, propylene carbonate, γ-butyrolactone, dioxolane, hexamethyl phosphoamide, pyridine, dimethyl sulfoxide, tributyl phosphate, trimethyl phosphate, N,N,N,N-tetraethyl sulfamide, and sulfone and their mixtures. Preferably, the organic solvent is a sulfone or a mixture of sulfones. Examples of sulfones are dimethyl sulfone and sulfolane. Sulfolane may be employed as the sole solvent or in combination, for example, with other sulfones.

The organic solvent used in the electrolyte should be capable of dissolving the polysulphide species, for example, of the formula $S_n^{2-}$, where n=2 to 12, that are formed when the electroactive sulphur material is reduced during discharge of the cell.

In one embodiment, the electrolyte comprises lithium trifluoromethanesulphonate and sulfolane.

The concentration of lithium salt in the electrolyte is preferably 0.1 to 5M, more preferably 0.5 to 3M, for example, 1M. The lithium salt is preferably present at a concentration that is at least 70%, preferably at least 80%, more preferably at least 90%, for example, 95 to 99% of saturation.

Preferably, the surfactant is a non-ionic surfactant. Suitable surfactants include long chain alcohols (such as fatty alcohols, cetyl alcohol, stearyl alcohol, cetostearyl alcohol and olely alcohol); alcohol ethoxylates (eg Tergitol 15-S-5, -7 and -9); polyoxyethylene glycol alkyl ethers (Brij), for example octaethylene glycol monododecyl ether and pentaethylene glycol monododecyl ether; polyoxypropylene glycol alkyl ethers; glucoside alkyl ethers, for example decyl glucoside, lauryl glucoside and octyl glucoside; polyoxyethylene glycol octylphenol ethers, for example Triton X-100; polyoxyethylene glycol alkylphenol ethers, for example nonxynol-9; glycerol alkyl esters, for example glyceryl laurate; polyoxyethylene glycol sorbitan alkyl esters, sorbitan alkyl esters, cocamide MEA, cocamide DEA, dodecyldimethylamine oxide, block copolymers of polyethylene glycol and polypropylene glycol (poloxamers) and polyethoxy tallow amine (POEA). Preferably, the surfactant does not include fluorine. Preferably, the surfactant is not a fluorine-based surfactant represented by a formula:

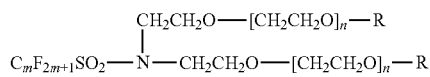

Wherein R is a hydrogen, an acetyl group, a methyl group, or a benzoyl group; and m and n are integers from 2 to 20.

Preferably, the surfactant is selected from secondary alcohol ethoxylates, tetraethylene glycol dodecyl ethers, silicone glycols, imidazolines, polyoxyethylene sorbitan monopalmitates and polyoxyethylene nonyl-phenyl ethers and mixtures thereof. In one embodiment, the surfactant is an alcohol ethoxylate, a polyethylene glycol alkyl ether (e.g. polyethylene glycol dodecyl ether) or a polyoxytheylene alkyl ether (e.g. polyoxyethylene oleyl ether or polyoxyethylene lauryl ether).

In a preferred embodiment, the surfactant is an alcohol ethoxylate, for example, a secondary alcohol ethoxylate. For example, the secondary alcohol ethoxylate may have the general formula:

where x is an integer of 5 to 9, for example, 5, 7 or 9.

In one embodiment, the surfactant has the formula:

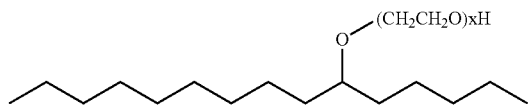

where x is an integer of 5 to 9, for example, 5, 7 or 9, preferably 5. Suitable examples of such surfactants include those sold under the trademark Tergitol 15-S, for example, Tergitol 15-S-5, Tergitol 15-S-7 and Tergitol 15-S-9.

Without wishing to be bound by any theory, alcohol ethoxylates (e.g. the secondary alcohol ethoxylates described above) can be used to improve the discharge capacity and/or cycling efficiency of a lithium-sulphur cell. Electrolytes containing such surfactants have been found to be capable of wetting separators formed, for example, of polypropylene and/or polyethylene more effectively. This in turn may improve the electrochemical performance of the cell. In some embodiments, the effect is particularly pronounced when the electrolyte comprises a sulfone solvent, for example, sulfolane. Sulfolane is typically viscous and may not wet the cell's separators effectively. However, when an alcohol ethoxylate is dispersed in a sulfone (e.g. sulfolane) solvent, the wetting capability of the solvent may be significantly improved.

Preferably, the concentration of surfactant in the electrolyte is 0.5-3 weight %, more preferably 1.25-2.25 weight %, for example 1.75 weight %. In one embodiment, the concentration of surfactant in the electrolyte is 0.75 weight %.

Preferably, the surfactant is present in an amount of 3-35 weight % in relation to the weight of the separator, more preferably 5-20%, for example 10-15%.

In one embodiment, the electrolyte comprises at least one lithium salt and at least one organic solvent; and a surfactant, wherein the concentration of surfactant in the electrolyte is 0.5-3 weight %.

The separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Preferably, the porosity of the separator is 40-60%, more preferably 45-55%, for example 50%. Suitable separators include a mesh formed of a polymeric material. Suitable polymers include polypropylene, nylon and polyethylene. Non-woven polypropylene is particularly preferred. It is possible for a multi-layered separator to be employed.

Preferably, the separator is selected from non-woven polypropylene and polyethylene.

Preferably, the permeability of the separator is less than 300 Gurley, more preferably less than 250 Gurley, for example 200 Gurley.

The separator is preferably devoid of a surfactant-containing coating. For example, the separator may be devoid of a coating containing at least one surfactant selected from secondary alcohol ethoxylates, tetraethylene glycol dodecyl ethers, silicone glycols, imidazolines, polyoxyethylenesorbitan monopalmitates and polyoxyethylene nonyl-phenyl ethers and mixtures thereof.

As discussed above, according to one aspect of the present invention there is provided a method of producing a lithium-sulphur cell as defined herein, said method comprising: incorporating an electrolyte comprising at least one lithium salt, at least one organic solvent, and a surfactant into a cell assembly comprising an anode comprising lithium metal or lithium metal alloy, a cathode comprising a mixture of electroactive sulphur material and solid electroconductive material, and a porous separator.

In a preferred embodiment of the invention, electrolyte is incorporated into the cell assembly by coating the electrolyte on the cathode, placing the separator over the coated cathode and placing the anode over the separator. The coating may be carried out in any suitable way, for example by spraying, extruding, pouring and/or spreading the electrolyte over the active sulphur material.

Alternatively, a cell assembly comprising an anode comprising lithium metal or lithium metal alloy, a cathode comprising a mixture of electroactive sulphur material and solid electroconductive material, and a porous separator may be produced, and an electrolyte comprising at least one lithium salt, at least one organic solvent, and a surfactant subsequently introduced into the cell assembly.

After the electrolyte is incorporated into the cell assembly, the cell may be sealed e.g. in an enclosure. The enclosure may be water-tight and/or air-tight. Suitable enclosures include pouches.

Preferably, the anode is a metal foil electrode, such as a lithium foil electrode.

The cathode of the electrochemical cell includes a mixture of electroactive sulphur material and electroconductive material. This mixture forms an electroactive layer, which may be placed in contact with a current collector.

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Preferably, carbon black is employed.

The electrolyte comprises at least one lithium salt, at least one organic solvent and a surfactant. Suitable lithium salts include at least one of lithium hexafluorophosphate ($LiPF_6$), lithium hexafluoroarsenate ($LiAsF_6$), lithium perchlorate ($LiClO_4$), lithium trifluoromethanesulfonimide (LiN($CF_3SO_2)_2$)), lithium borofluoride, lithium trifluoromethanesulphonate ($CF_3SO_3Li$), and lithium bis(oxalato)borate ($LiB(C_2O_4)_2$). Preferably the lithium salt is lithium trifluoromethanesulphonate.

Suitable organic solvents for use in the electrolyte are tetrahydrofurane, 2-methyltetrahydrofurane, dimethylcarbonate, diethylcarbonate, ethylmethylcarbonate, methylpropylcarbonate, methylpropylpropionate, ethyl propylpropionate, methyl acetate, dimethoxyethane, 1,3-dioxolane, diglyme (2-methoxyethyl ether), tetraglyme, ethylene carbonate, propylene carbonate, γ-butyrolactone, dioxolane, hexamethyl phosphoamide, pyridine, dimethyl sulfoxide, tributyl phosphate, trimethyl phosphate, N,N,N,N-tetraethyl sulfamide, and sulfone and their mixtures. Preferably, the organic solvent is a sulfone or a mixture of sulfones. Examples of sulfones are dimethyl sulfone and sulfolane. Sulfolane may be employed as the sole solvent or in combination, for example, with other sulfones.

The organic solvent used in the electrolyte should be capable of dissolving the polysulphide species, for example, of the formula $S_n^{2-}$, where n=2 to 12, that are formed when the electroactive sulphur material is reduced during discharge of the cell.

In one embodiment, the electrolyte comprises lithium trifluoromethanesulphonate and sulfolane.

The concentration of lithium salt in the electrolyte is preferably 0.1 to 5M, more preferably 0.5 to 3M, for example, 1M. The lithium salt is preferably present at a concentration that is at least 70%, preferably at least 80%, more preferably at least 90%, for example, 95 to 99% of saturation.

Preferably, the surfactant is a non-ionic surfactant. Suitable surfactants include long chain alcohols (such as fatty alcohols, cetyl alcohol, stearyl alcohol, cetostearyl alcohol and olely alcohol); alcohol ethoxylates (eg Tergitol 15-S-5, -7 and -9); polyoxyethylene glycol alkyl ethers (Brij), for example octaethylene glycol monododecyl ether and pentaethylene glycol monododecyl ether; polyoxypropylene glycol alkyl ethers; glucoside alkyl ethers, for example decyl glucoside, lauryl glucoside and octyl glucoside; polyoxyethylene glycol octylphenol ethers, for example Triton X-100; polyoxyethylene glycol alkylphenol ethers, for example nonxynol-9; glycerol alkyl esters, for example glyceryl laurate; polyoxyethylene glycol sorbitan alkyl esters, sorbitan alkyl esters, cocamide MEA, cocamide DEA, dodecyldimethylamine oxide, block copolymers of polyethylene glycol and polypropylene glycol (poloxamers) and polyethoxy tallow amine (POEA). Preferably, the surfactant does not include fluorine. Preferably, the surfactant is not a fluorine-based surfactant represented by a formula:

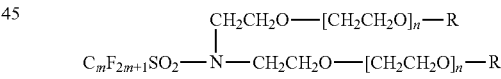

Wherein R is a hydrogen, an acetyl group, a methyl group, or a benzoyl group; and m and n are integers from 2 to 20.

Preferably, the surfactant is selected from secondary alcohol ethoxylates, tetraethylene glycol dodecyl ethers, silicone glycols, imidazolines, polyoxyethylene sorbitan monopalmitates and polyoxyethylene nonyl-phenyl ethers and mixtures thereof. In one embodiment, the surfactant is an alcohol ethoxylate, a polyethylene glycol alkyl ether (e.g. polyethylene glycol dodecyl ether) or a polyoxytheylene alkyl ether (e.g. polyoxyethylene oleyl ether or polyoxyethylene lauryl ether).

In a preferred embodiment, the surfactant is an alcohol ethoxylate. An example is 2-dodecoxyethanol (Brij-30). Other examples include secondary alcohol ethoxylates. For example, the secondary alcohol ethoxylate may have the general formula:

where x is an integer of 5 to 9, for example, 5, 7 or 9.

In one embodiment, the surfactant has the formula:

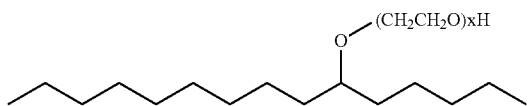

where x is an integer of 5 to 9, for example, 5, 7 or 9, preferably 5. Suitable examples of such surfactants include those sold under the trademark Tergitol 15-S, for example, Tergitol 15-S-5 (x=5), Tergitol 15-S-7 (x=7) and Tergitol 15-S-9 (x=9).

Without wishing to be bound by any theory, alcohol ethoxylates (e.g. the secondary alcohol ethoxylates described above) can be used to improve the discharge capacity and/or cycling efficiency of a lithium-sulphur cell. Electrolytes containing such surfactants have been found to be capable of wetting separators formed, for example, of polypropylene and/or polyethylene more effectively. This in turn may improve the electrochemical performance of the cell. In some embodiments, the effect is particularly pronounced when the electrolyte comprises a sulfone solvent, for example, sulfolane. Sulfolane is typically viscous and may not wet the cell's separators effectively. However, when an alcohol ethoxylate is dispersed in a sulfone (e.g. sulfolane) solvent, the wetting capability of the solvent may be significantly improved.

Preferably, the concentration of surfactant in the electrolyte is 0.75-3 weight %, more preferably 1.25-2.25 weight %, for example 1.75 weight %.

Preferably, the surfactant is present in an amount of 3-35 weight % in relation to the weight of the separator, more preferably 5-20%, for example 10-15%.

In one embodiment, the electrolyte comprises at least one lithium salt and at least one organic solvent; and a surfactant, wherein the concentration of surfactant in the electrolyte is 0.5-3 weight %.

The separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Preferably, the porosity of the separator is 40-60%, more preferably 45-55%, for example 50%. Suitable separators include a mesh formed of a polymeric material. Suitable polymers include polypropylene, nylon and polyethylene. Non-woven polypropylene is particularly preferred. It is possible for a multi-layered separator to be employed.

Preferably, the separator is selected from non-woven polypropylene and polyethylene.

Preferably, the permeability of the separator is less than 300 Gurley, more preferably less than 250 Gurley, for example 200 Gurley.

The separator is preferably devoid of a surfactant-containing coating. For example, the separator may be devoid of a coating containing at least one surfactant selected from secondary alcohol ethoxylates, tetraethylene glycol dodecyl ethers, silicone glycols, imidazolines, polyoxyethylenesorbitan monopalmitates and polyoxyethylene nonyl-phenyl ethers and mixtures thereof.

EXAMPLES

Example 1

In this Example, the charge and discharge capacity of two lithium-sulphur cells were measured over a number of cycles. The cells were assembled using a lithium anode and a positive electrode comprising 70% sulphur, 10% carbon black and 20% polyethylene oxide (PEO). Each cell also contained, respectively:
(i) a Celgard 3501 separator (coated with surfactant) and an electrolyte consisting of 1M lithium trifluoromethanesulphonate (triflate) in sulfolane (not comprising added surfactant).
(ii) a Toray V20CFD separator (not coated with surfactant) and the electrolyte of (i) above comprising added surfactant. The added surfactant was an imidazoline and polyethylene glycol.

As can be seen from FIG. 1, the rate of decrease of both the charge and discharge capacities of cell (i) were greater than those of cell (ii). The latter contained an electrolyte comprising added surfactant.

Example 2

In this Example, the discharge capacities of various lithium-sulphur cells according to the present invention were measured over a number of cycles. The cells included, respectively:
(i) a Celgard 2500 separator (not coated with surfactant) and an electrolyte of 1M lithium triflate in sulfolane to which Tergitol 15-S-5 is added as surfactant.
(ii) a Toray V20CFD separator (not coated with surfactant) and an electrolyte of 1M lithium triflate in sulfolane to which Tergitol 15-S-5 is added as surfactant.
(iii) a Celgard EM2000 separator (not coated with surfactant) and an electrolyte of 1M lithium triflate in sulfolane to which Tergitol 15-S-5 is added as surfactant.

The discharge capacity of cell comprising a Celgard 3501 separator (coated with surfactant) and an electrolyte of 1M lithium triflate in sulfolane (not comprising surfactant) was also measured over a number of cycles. The concentration of the surfactant in each of the electrolyte in each of the cells was approximately 2 weight %.

The results are shown in FIG. 2. As can be seen from FIG. 2, the rate of decrease in discharge capacity is lower for cells (i) to (iii) in comparison to that of the cell comprising the Celgard 3501 separator.

Example 3

In this Example, a number of lithium sulphur cells with varying surfactant (Tergitol 15-S-5) concentrations in an electrolyte of 1M lithium triflate in sulfolane were subjected to pre-cycling (cycling under standard conditions until their capacity developed to its full value) approximately 24 hours from assembly. Following pre-cycling, the first discharge capacity was measured. The first discharge capacity of a reference cell, comprising a Celgard 3501 separator (with surfactant coating) and an electrolyte of 1M lithium triflate in sulfolane was also measured following pre-cycling.

As can be seen from Table 1, below surfactant concentrations of 0.5 weight %, the resistance following pre-cycling is too high and the discharge capacity is very low.

TABLE 1

| Cell number | Surfactant concentration in electrolyte | Pre-cycling data (~24 hrs from assembly) | | 1$^{st}$ Discharge capacity (mAh/g) |
| --- | --- | --- | --- | --- |
| | | Rp (Ω) | Cp (μF) | |
| 1 | 2.23% | 0.659 | 136 | 1175 |
| 2 | 1.75% | 0.610 | 132 | 1146 |
| 3 | 1.25% | 0.652 | 114 | 1186 |
| 4 | 0.75% | 0.731 | 93 | 1251 |
| 5 | 0.25% | 4.488 | 3.8 | 161 |
| 6 | 0.50% | 0.754 | 51 | 1168 |
| Ref. cell | n/a | 0.456 | 122 | 1165 |

Example 4

In this Example, the discharge capacities of various lithium-sulphur cells according to the present invention were measured over a number of cycles. The cells included, respectively:
- (i) a Toray V20CFD separator (not coated with surfactant) and an electrolyte of 1M lithium triflate in sulfolane to which Tergitol 15-S-5 is added as surfactant.
- (ii) a Toray V20CFD separator (not coated with surfactant) and an electrolyte of 1M lithium triflate in sulfolane to which 4-n-p-p glycol (4-Nonylphenyl-polyethylene glycol) is added as surfactant.

The concentration of the surfactant in each of the electrolyte in each of the cells was approximately 2 weight %. The discharge capacity is highest with cell (i) above.

Example 5

In this Example, the discharge capacities of various lithium-sulphur cells were measured over a number of cycles. The cells included, respectively:
- (i) a Celgard 2500 separator (coated with surfactant) and an electrolyte of 1M lithium triflate in sulfolane.
- (ii) a Toray V20CFD separator (not coated with surfactant) and an electrolyte of 1M lithium triflate in sulfolane to which Tergitol 15-S-5 is added as surfactant. The concentration of surfactant in the electrolyte was 2.23% by weight.
- (iii) a Toray V20CFD separator (not coated with surfactant) and an electrolyte of 1M lithium triflate in sulfolane to which Brij30 (2-dodecoxyethanol) is added as surfactant. The concentration of surfactant in the electrolyte was 2.23% by weight.
- (iv) a Toray V20CFD separator (not coated with surfactant) and an electrolyte of 1M lithium triflate in sulfolane to which Tween40 (Polyoxyethylenesorbitan monopalmitate) is added as surfactant. The concentration of surfactant in the electrolyte was 2.23% by weight.

The results are shown in FIG. 3. As can be seen from FIG. 3, the rate of decrease in discharge capacity is lower for cells that include an alcohol ethoxylate as surfactant (ii) and (iii).

Example 6

In this Example, the discharge capacities of various lithium-sulphur cells were measured over a number of cycles. The cells included, respectively:
- (i) an electrolyte comprising 1M lithium triflate in sulfolane
- (ii) an electrolyte comprising 1M lithium triflate in sulfolane to which Tergitol 15-S-5 was added as surfactant. The concentration of surfactant in the electrolyte was 1.5 weight %.
- (iii) an electrolyte comprising 1M lithium triflate in methylglutaronitrile (MGN) to which Tergitol 15-S-5 was added as surfactant. The concentration of surfactant in the electrolyte was 1.5 weight %.

Cell (i) above did not cycle. Cells (ii) and (iii) cycled. However, as can be seen from FIG. 4, discharge characteristics of cell (ii) are superior to the discharge characteristics of cell (iii). This is believed to be because of a synergistic effect between the alcohol ethoxylate surfactant and sulfolane.

The invention claimed is:

1. An electrolyte for a lithium sulphur cell comprising:
   at least one lithium salt and at least one organic solvent; and
   a surfactant, wherein the concentration of surfactant in the electrolyte is 0.5-3 weight %, wherein the surfactant is a secondary alcohol ethoxylate and wherein the electrolyte comprises sulfone as one of the at least one organic solvents.

2. The electrolyte of claim 1, wherein the at least one organic solvent comprises sulfone and at least one co-solvent selected from tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1,3-dioxolane, diglyme (bis-(2-methoxyethyl)ether), tetraglyme, ethylene carbonate, propylene carbonate, γ-butyrolactone, dioxolane, hexamethyl phosphoamide, pyridine, dimethyl sulfoxide, tributyl phosphate, trimethyl phosphate, N, N, N, N-tetraethyl sulfamide, and mixtures thereof.

3. The electrolyte of claim 1, wherein the surfactant comprises a secondary alcohol ethoxylate in combination with a second surfactant that is selected from tetraethylene glycol dodecyl ethers, silicone glycols, imidazolines, polyoxyethylenesorbitan monopalmitates and polyoxyethylene nonyl-phenyl ethers and mixtures thereof.

4. The electrolyte of claim 3, wherein the at least one lithium salt is selected from lithium hexafluorophosphate (LiPF$_6$), lithium hexafluoroarsenate (LiAsF$_6$), lithium perchlorate (LiClO$_4$), lithium bis (trifluoromethanesufonyl)imide (LiN(CF$_3$SO$_2$)$_2$), lithium tetrafluoroborate, lithium trifluoromethanesulphonate (CF$_3$SO$_3$Li), and lithium bis (oxalato)borate (LiB(C$_2$O$_4$)$_2$).

5. The electrolyte of claim 1, wherein the concentration of surfactant in the electrolyte is 0.75-3.0 weight %.

6. A lithium-sulphur cell comprising:
   an anode comprising lithium metal or lithium metal alloy;
   a cathode comprising a mixture of electroactive sulphur material and solid electroconductive material;
   a porous separator; and
   an electrolyte comprising at least one lithium salt, at least one organic solvent and a surfactant, wherein the surfactant is a secondary alcohol ethoxylate and wherein the electrolyte comprises sulfone as one of the at least one organic solvents.

7. The cell of claim 6, wherein the separator comprises a mesh formed of a polymeric material.

8. The cell of claim 7, wherein the polymeric material is selected from polypropylene, nylon and polyethylene or combinations thereof.

9. The cell of claim 6, wherein the porosity of the separator is 40-60%.

10. The cell of claim 6, wherein the permeability of the separator is less than 300 Gurley.

11. The cell of claim 6, wherein the surfactant is present in an amount of 3-35 weight % in relation to the weight of the separator.

12. The cell of claim 6, wherein the surfactant is has the general formula:

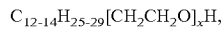

where x is an integer of 5 to 9.

13. The cell of claim 12, wherein the sulfone is sulfolane.

14. A method of producing a lithium-sulphur cell comprising:
  incorporating an electrolyte comprising at least one lithium salt, at least one organic solvent, and a surfactant into a cell assembly, the cell assembly comprising:
    an anode comprising lithium metal or lithium metal alloy,
    a cathode comprising a mixture of electroactive sulphur material and solid electroconductive material, and
    a porous separator;
  wherein the surfactant is a secondary alcohol ethoxylate and wherein the electrolyte comprises sulfone as one of the at least one organic solvents.

15. The method of claim 14, further comprising coating the electrolyte on the cathode, placing the separator over the coated cathode and placing the anode over the separator.

* * * * *